(12) United States Patent
Liu et al.

(10) Patent No.: US 11,128,344 B2
(45) Date of Patent: Sep. 21, 2021

(54) CHANNEL SWITCHING PROCESSING METHOD, DEVICE AND SYSTEM, STORAGE MEDIUM, AND ELECTRONIC DEVICE

(71) Applicant: Gree Electric Appliances, Inc. of Zhuhai, Guangdong (CN)

(72) Inventors: Quanzhou Liu, Guangdong (CN); Jie Tang, Guangdong (CN); Weiyou Yu, Guangdong (CN); Tieying Ye, Guangdong (CN); Chunwei Yuan, Guangdong (CN); Huantao Ye, Guangdong (CN); Zhongzheng Li, Guangdong (CN); Yufa Li, Guangdong (CN); Chenjie Li, Guangdong (CN); Guo Yao, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 0 days.

(21) Appl. No.: 17/046,923

(22) PCT Filed: Dec. 6, 2018

(86) PCT No.: PCT/CN2018/119537
§ 371 (c)(1),
(2) Date: Oct. 12, 2020

(87) PCT Pub. No.: WO2019/196440
PCT Pub. Date: Oct. 17, 2019

(65) Prior Publication Data
US 2021/0050880 A1  Feb. 18, 2021

(30) Foreign Application Priority Data

Apr. 13, 2018 (CN) .................. 201810333815.X (51) Int. Cl.
*H04B 3/04* (2006.01)
*H04B 3/46* (2015.01)
*H04B 3/54* (2006.01)

(52) U.S. Cl.
CPC ................. *H04B 3/04* (2013.01); *H04B 3/46* (2013.01); *H04B 3/54* (2013.01); *H04B 2203/5466* (2013.01)

(58) Field of Classification Search
CPC .... H04B 2203/5408; H04B 3/04; H04B 3/46; H04B 2203/5416; H04B 2203/5425;
(Continued)

(56) References Cited

U.S. PATENT DOCUMENTS 8,520,696 B1 * 8/2013 Corral .................. H04B 3/54
370/463
9,350,423 B2   5/2016 Mitchell et al.
(Continued)

FOREIGN PATENT DOCUMENTS

CN  103636140 A  3/2014
CN  107750421 A  3/2018
(Continued)

*Primary Examiner* — Khanh C Tran
(74) *Attorney, Agent, or Firm* — The Webb Law Firm (57) ABSTRACT

The embodiments of the present disclosure disclose a channel switching processing method, device and system, storage medium, and an electronic device. The channel switching processing method includes: acquiring a signal noise on a first channel corresponding to a first power line, wherein a communication signal is transmitted on the first channel; comparing a magnitude of the signal noise to a predetermined threshold; and in the event that the signal noise of the first channel is greater than a signal noise of a second channel, switching the communication signal from the first channel to the second channel corresponding to a second power line according to a comparison result.

19 Claims, 3 Drawing Sheets

(58) Field of Classification Search
CPC .... H04B 2203/5483; H04B 2203/5495; H04B 3/54; H04L 12/2803; H04L 12/2838; H04L 2012/2843
See application file for complete search history.

(56) References Cited

U.S. PATENT DOCUMENTS

| | | | |
|---|---|---|---|
| 9,935,453 B2 | 4/2018 | Alaas et al. | |
| 2013/0335207 A1* | 12/2013 | Magin | H04B 3/56 340/12.37 |
| 2014/0205026 A1* | 7/2014 | Smaini | H04B 3/54 375/257 |
| 2014/0269952 A1* | 9/2014 | Katar | H04B 3/56 375/258 |
| 2017/0063356 A1 | 3/2017 | Hung | |
| 2019/0033849 A1* | 1/2019 | Celia | G06N 3/0454 |

FOREIGN PATENT DOCUMENTS

| | | |
|---|---|---|
| CN | 107872244 A | 4/2018 |
| CN | 107872248 A | 4/2018 |
| CN | 108599811 A | 9/2018 |

* cited by examiner

CHANNEL SWITCHING PROCESSING METHOD, DEVICE AND SYSTEM, STORAGE MEDIUM, AND ELECTRONIC DEVICE

CROSS-REFERENCE TO RELATED APPLICATIONS

This application is the United States national phase of International Application No. PCT/CN2018/119537 filed Dec. 6, 2018, and claims priority to Chinese Patent Application No. 201810333815.X filed Apr. 13, 2018, the disclosures of which are hereby incorporated by reference in their entirety.

BACKGROUND OF THE INVENTION

Field of the Invention

The present disclosure relates to the technical field of power communication, and in particular, to a channel switching processing method, device and system, storage medium, and an electronic device.

Description of Related Art

The power line carrier communication technology is developed vigorously, and its application range is wider and wider. The power carrier communication is to load a communication signal in a power line for communication. When an electric power network is interfered by noise and the like, communication signals transmitted on the channel will be also interfered, resulting in abnormal communication and greatly reduced communication quality.

In general, outer units and inner units adopt at least one of a three-phase supply or a single-phase power supply to supply power. In the event that a three-phase power supply is adopted, an equipment will be connected under different phase power supplies, thus has to realize signal transmission through signal coupling between three phases. In this case, when one channel is interfered, other channels will be also interfered, resulting in a lower communication quality.

SUMMARY OF THE INVENTION

According to one of the embodiments of the present disclosure, a method for processing channel switching is provided, comprising: acquiring a signal noise of a first channel which corresponds to a first power line, wherein a communication signal is transmitted on the first channel; comparing a magnitude of the signal noise of the first channel to a predetermined threshold; and switching the communication signal from the first channel to a second channel which corresponds to a second power line according to a comparison result, the signal noise of the first channel is greater than a signal noise of the second channel.

According to one of the embodiments of the present disclosure, a system for processing channel switching is provided, comprising: air conditioning units, each unit of the air conditioning units is connected with at least two power lines of multiphase power lines; a noise detection module connected with all power lines of the multiphase power lines, configured to detect signal noises of channels which correspond to all the power lines respectively; and a channel switching module connected with all power lines of the multiphase power lines, configured to determine whether to perform channel switching according to a detection result of the noise detection module.

According to one of the embodiments of the present disclosure, a device for processing channel switching is provided, comprising: an acquisition module configured to acquire a signal noise of a first channel which corresponds to a first power line, wherein a communication signal is transmitted on the first channel; a comparison module configured to compare a magnitude of the signal noise of the first channel to a predetermined threshold; and a switching module configured to switch the communication signal from the first channel to a second channel which corresponds to a second power line according to a comparison result, wherein the signal noise of the first channel and the signal noise of the second channel are different in magnitude.

According to one of the embodiments of the present disclosure, a storage medium having stored thereon computer program instructions is provided, wherein the computer program when executed is configured to perform the method of any of the above.

According to one of the embodiments of the present disclosure, an electronic device is provided, comprising a memory having a computer program stored thereon, and a processor configured to execute the computer program to perform the method of any of the above.

BRIEF DESCRIPTION OF THE DRAWINGS

The accompanying drawings, which are illustrated herein to provide a further understanding of the present disclosure, constitute a part of this application. The accompanying drawings, together with the illustrative embodiments and the description of the present disclosure serve to explain the present disclosure but do not to limit the present disclosure. In the drawings.

DESCRIPTION OF THE INVENTION

In order to make the technical solutions of the present disclosure better understood by those skilled in the art, the technical solutions in the embodiments of the present disclosure will be clearly and completely described below with reference to the drawings in the embodiments of the present disclosure, and it is obvious that the described embodiments are only some embodiments of the present disclosure, and not all embodiments. All other embodiments obtained by those skilled in the art based on the embodiments in the present disclosure without making creative efforts shall fall within the scope of protection of the present disclosure.

It should be noted that, the terms "first", "second" and the like in the description and claims and in the drawings of the present disclosure are used for distinguishing between similar objects and not necessarily for describing a particular sequential or chronological order. It is to be understood that the data so used is interchangeable under appropriate circumstances such that the embodiments of the present disclosure described herein are carried out in other sequences than those illustrated or described herein. Moreover, the terms "comprising" and "having" and any variations thereof, are intended to cover a non-exclusive inclusion, such that a process, method, system, product, or apparatus that comprises a series of steps or elements is not necessarily limited to those steps or elements explicitly listed, but can include other steps or elements not explicitly listed or inherent to such process, method, product, or apparatus.

Figure 1:
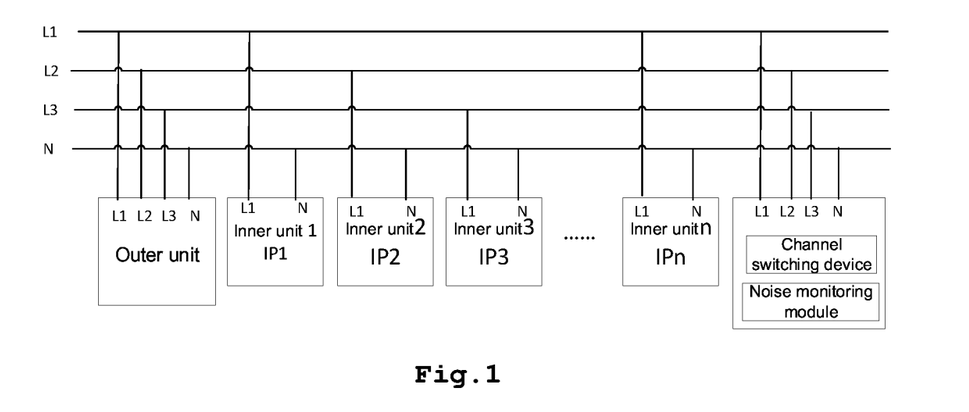
FIG. 1 is a network connection topology diagram of some embodiments of a channel switching processing system according to some embodiments of the present disclosure.

The embodiments of the present disclosure provide a network connection topology having a channel switching processing system of the present disclosure in power line carrier communication, and FIG. 1 is a schematic diagram of the network connection topology provided according to some embodiments of the present disclosure. As shown in FIG. 1, the network connection topology includes: four power lines (L1, L2, L3, N), air conditioning units (outer unit, inner unit 1, . . . , inner unit n, where n is an integer greater than or equal to 1), a channel switching device and a noise detection module, wherein the outer unit, the channel switching device and the noise detection module are connected with the four power lines, and the inner unit 1, . . . , inner unit n are respectively connected with at least two of the four power lines, wherein one of the at least two power lines is a neutral. This network connection topology is merely an example and is not intended to be limiting.

According to some embodiments of the present disclosure, a channel switching processing method is provided, which is implemented based on the network connection topology shown in FIG. 1, but is not limited thereto, and it should be noted that the steps shown in the flowchart of the figure are executed in a computer system such as a set of computer executable instructions, and that although a logical order is shown in the flowchart, in some cases, the steps shown or described will be executed in an order different from that shown here.

Figure 2:
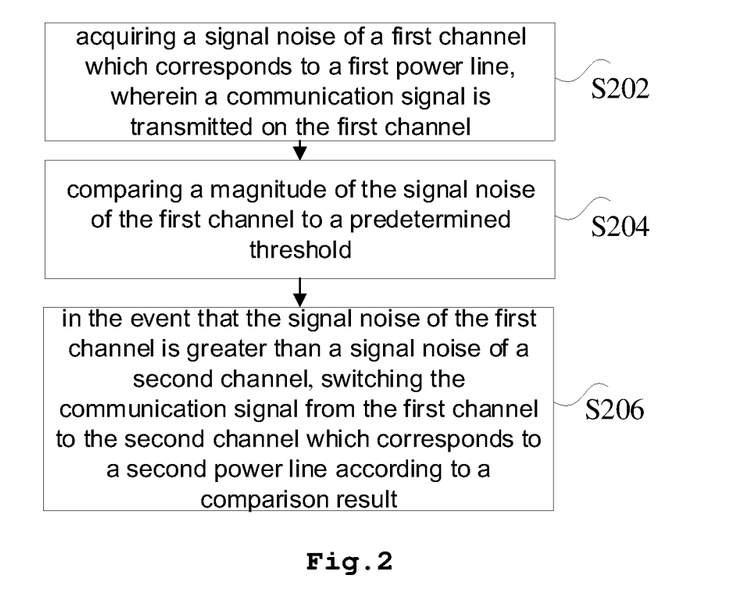
FIG. 2 is a flowchart diagram of some embodiments of a channel switching processing method of the present disclosure.

FIG. 2 is a flowchart schematic of a channel switching processing method provided according to an embodiment of the present disclosure, and as shown in FIG. 2, the method comprises the following steps:

in step S202, acquiring a signal noise of a first channel which corresponds to a first power line, wherein a communication signal is transmitted on the first channel;

in step S204, comparing a magnitude of the signal noise of the first channel to a predetermined threshold;

in step S206, switching the communication signal from the first channel to a second channel which corresponds to a second power line according to a comparison result, wherein the signal noise of the first channel is greater than a signal noise of the second channel.

Through the steps, by acquiring a signal noise of a first channel on which a communication signal is transmitted and determining whether or not to switch the communication signal from the first channel to a second channel with a smaller signal noise according to a comparison result of comparing the acquired signal noise with the predetermined threshold, e.g., by determining whether or not to perform channel switching by comparing the signal noise of the first channel on which the communication signal is transmitted with the predetermined threshold, the signal will be switched to a channel with a smaller noise when the signal noise of the first channel is larger, thereby ensuring successful communication, improving reliability of signal transmission, and solving the technical problem in the power line carrier communication technology that communication signals transmitted on the channel are interfered, resulting in abnormal communication.

In some embodiments, the step S206 is: switching the communication signal from the first channel to the second channel when the comparison result indicates that the signal noise of the first channel is greater than the predetermined threshold, wherein the second channel is a channel with the smallest signal noise among a plurality of channels which correspond to the multiphase power lines respectively. That is, by switching the communication signal to a channel with a minimum noise and avoiding a channel with a maximum signal noise, the communication quality is effectively improved.

In some embodiments, the first power line is L1, L2 or L3 as shown in FIG. 1, but is not limited thereto.

Taking the first power line as L1 for example, if the communication signal will be coupled to L2 and L3 when transmitted on L1, the method is: detecting a signal noise on L1, and detecting a signal noise on L2 to be the smallest among L1, L2, and L3; if the detected signal noise on L1 is greater than a predetermined threshold, the communication signal is switched from L1 to L2.

In some embodiments, the step S202 is: acquiring a noise amplitude on the first channel in real time; selecting a noise amplitude in a predetermined time period from the acquired noise amplitude; and calculating a root mean square value of the noise amplitude in the predetermined time period, and taking the root mean square value as the signal noise.

In some embodiments of the present disclosure, after switching the communication signal from the first channel to the second channel, the method further comprise: stopping coupling the communication signal to other power lines in the predetermined time period, wherein the other power lines are power lines other than the first power line in the multiphase power lines.

In some embodiments, after switching the communication signal from the first channel to the second channel, the channel switching processing method further comprises: acquiring and storing data information of the communication signal in the predetermined time period; and transmitting the data information to a designated unit, wherein the designated unit is a unit of one or more units connected to other power lines than the first power line in the multiphase power lines.

By stopping coupling the communication signal in the predetermined time period to other power lines, and directly transmitting the stored data information of the communication signal in the predetermined time period to the unit connected to other power lines, normal transmission of data is realized, the noise is reduced, and the communication quality is improved.

In some embodiments, the predetermined time period is adjusted according to actual test conditions and is not limited thereto.

In some embodiments of the present disclosure, before step S202, the channel switching processing method further comprise: acquiring and storing identifiers of one or more inner units connected to the multiphase power lines.

In some embodiments, the identifiers of the inner units can be, but not limited to, IP addresses of the inner units.

In some embodiments, the steps S202 and S204 is performed by the noise detection module in the topology shown in FIG. 1, and the step S206 is performed by the channel switching device in the topology shown in FIG. 1, but is not limited thereto.

Figure 5:
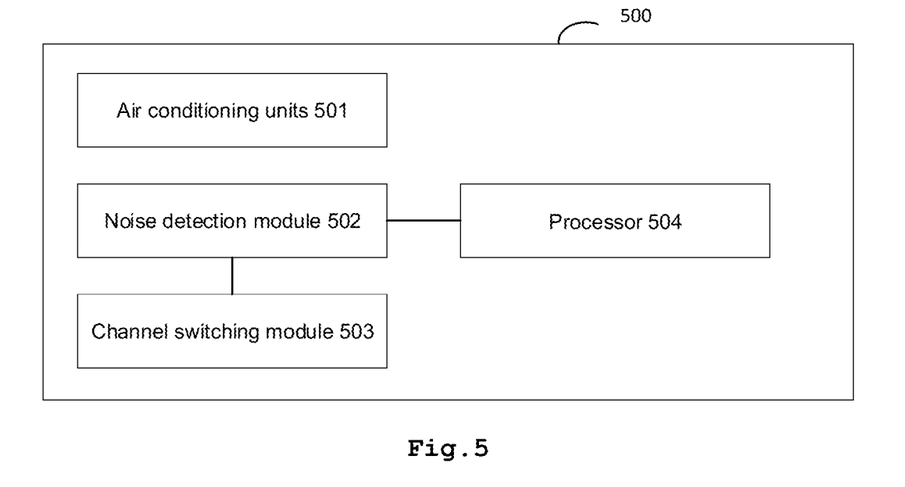
FIG. 5 is a schematic diagram of some embodiments of a channel switching processing system of the present disclosure.

Some embodiments of the present disclosure further provide a system for processing channel switching, and as shown in FIG. 5, the system comprises: air conditioning units 501, a noise detection module 502 and a channel switching module 503. The noise detection module and the channel switching module are connected with all power lines of the multiphase power lines, and each unit of the air conditioning units is connected with at least two power lines of the multiphase power lines; the noise detection module is configured to detect signal noises on channels corresponding to all the power lines, respectively; the channel switching module is configured to determine whether or not to perform channel switching according to a detection result of the noise detection module.

With the aid of the above system, by acquiring a signal noise of a first channel on which a communication signal is transmitted and determining whether or not to switch the communication signal from the first channel to a second channel with a smaller signal noise according to a comparison result of comparing the acquired signal noise of the first channel with a predetermined threshold, e.g., by determining whether or not to perform channel switching by comparing the signal noise of the first channel on which the communication signal is transmitted with the predetermined threshold, the signal will be switched to a channel with a smaller noise when the signal noise of the first channel is larger, thereby ensuring successful communication, improving reliability of signal transmission, and solving the technical problem in the power line carrier communication technology that communication signals transmitted on the channel are interfered, resulting in abnormal communication.

In some embodiments, the air conditioning units is the outer unit, the inner units, etc. shown in FIG. 1, the noise detection module is the noise detection module shown in FIG. 1, the channel switching module is the channel switching device shown in FIG. 1, and all the power lines is the four power lines shown in FIG. 1, but are not limited thereto.

In some embodiments, the noise detection module is further configured to detect the signal noise on the first channel which corresponds to the first power line among all the power lines, and compare the magnitude of the signal noise to a predetermined threshold. The communication signal is transmitted on the first channel. The channel switching module is configured to switch the communication signal from the first channel to a second channel which correspond to a second power line according to a comparison result, wherein the signal noises of the first channel and the second channel are different in magnitude. In some embodiments, the signal noise of the first channel is greater than the signal noise of the second channel, but it is not limited thereto.

In some embodiments, the channel switching module is further configured to switch the communication signal from the first channel to the second channel if the comparison result indicates that the signal noise of the first channel is greater than the predetermined threshold. The second channel is a channel with a minimum signal noise among a plurality of channels which correspond to the multiphase power lines respectively.

In some embodiments of the present disclosure, the channel switching processing system further comprise: a processor 504 connected to the noise detection module, and configured to stop coupling the communication signal to other power lines within the predetermined time period corresponding to the signal noise of the first channel. The other power lines are power lines other than the first power line among the multiphase power lines.

In some embodiments, the channel switching module is further configured to acquire and store data information of the communication signal within the predetermined time period corresponding to the signal noise of the first channel; and transmit the data information to a designated unit. The designated unit is a unit of one or more units connected to other power lines in the air conditioning units. The other power lines are power lines other than the first power line among the multiphase power lines.

For a better understanding of the embodiments of the present disclosure, the present disclosure is further explained below in conjunction with the embodiments.

The purpose of the embodiments of the present disclosure is to automatically detect the signal noise, and when the signal noise is larger, automatically switch a phase sequence of the power lines, so that the signal is transmitted in a power line with a relatively low noise, thereby improving the reliability of the signal.

The embodiments of the present disclosure provide a channel detecting and automatically switching device connected to a three-phase power supply, specifically with reference to FIG. 1, which detects a signal noise on three-phase power lines and automatically switches to a channel with a smaller noise.

As shown in FIG. 1, the channel switching device (corresponding to the channel switching module in the above embodiments) is connected to L1, L2, L3, and N.

Figure 3:
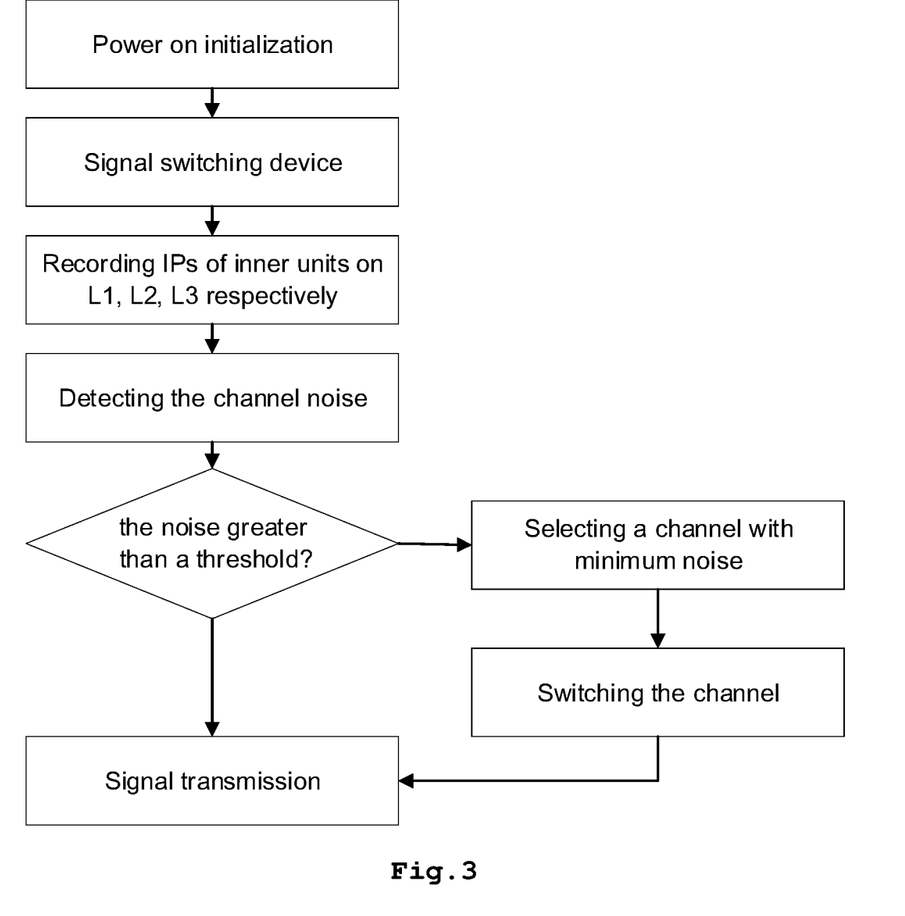
FIG. 3 is a schematic diagram of some embodiments of a channel switching flow of the present disclosure.

FIG. 3 is a schematic diagram of a channel switching flow provided according to some embodiments of the present disclosure, and as shown in FIG. 2, in conjunction with FIG. 1, the flow comprises:

The channel detecting and switching device automatically detects IPs of the inner units connected to L1 and N, L2 and N, and L3 and N upon power on, and stores this information, and when the number of inner units in the system is increased or decreased, the device re-detects and stores it.

In general, a signal is coupled to L2 and L3 when transmitted on L1, to ensure that modules connected to L2 and L3 can receive the signal effectively. The embodiments of the present disclosure provide a channel automatic switching technology. The noise detection module internally sets a noise threshold, and communication abnormality is caused when the noise exceeds this threshold. The noise detection module sends a real-time noise amplitude to a chip, and the chip calculates a root mean square value by selecting the noise amplitude in a time period, wherein the selection of the time period is adjusted according to actual test conditions. The chip feeds back the determined root mean square value to the noise detection module, the noise detection module compares the root mean square value with the threshold, and in the event that the root mean square value is greater than the threshold, the noise detection module sends a switching command to the channel switching device to instruct the channel switching device to perform channel switching on the signal. Or the noise detection module also sends the noise threshold to the chip; the chip compares the obtained root mean square value with the noise threshold, and in the event that the root mean square value is greater than the threshold, the chip sends a switching command to the channel switching device to instruct the channel switching device to perform channel switching on the signal. When the signal is transmitted on the L1 channel, the noise on L1 is maximum and greater than the set threshold, and the noise on L2 is minimum; the chip or noise detection module issues a signal switching command, then the signal is switched to the channel L2, and the coupling of the signal to L2 and L3 in this time period is stopped. After switching to a new channel, the chip sends the data in the time period to the channel switching device, and the channel switching device stores the data and transmits the data to the inner units connected to L1 and L2, and the channel with the largest noise interference is avoided.

Through the embodiments described above, the following technical effects will be achieved: avoiding the channel with the largest noise and automatically switching; when the noise is larger and exceeds the threshold, the channel switching device serves as a data transfer station to transmit data to other channels; when the noise is larger than the threshold, the communication will be influenced, by monitoring the channel noise in real time, the communication quality will be effectively improved.

Figure 4:
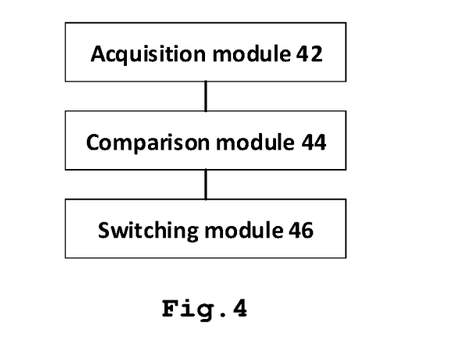
FIG. 4 is a schematic block diagram of some embodiments of a channel switching processing device of the present disclosure.

The embodiments of the present application further provide a channel switching processing device. FIG. 4 is a block diagram of a structure of the channel switching processing device provided according to some embodiments of the present disclosure, and as shown in FIG. 4, the channel switching processing device comprises:

an acquisition module 42 configured to acquire a signal noise of a first channel corresponding to a first power line, wherein a communication signal is transmitted on the first channel;

a comparison module 44 connected to the acquisition module 42, and configured to compare a magnitude of the signal noise to a predetermined threshold;

a switching module 46 connected to the comparison module 44, and configured to switch the communication signal from the first channel to a second channel which corresponds to a second power line according to a comparison result, wherein the signal noise of the first channel and the signal noise of the second channel are different in magnitude.

With the aid of the device, by acquiring the signal noise of the first channel on which the communication signal is transmitted, and determining whether or not to switch the communication signal from the first channel to the second channel with a smaller signal noise according to the comparison result of comparing the acquired signal noise of the first channel with a predetermined threshold, i.e., by determining whether or not to perform channel switching by comparing the signal noise of the first channel on which the communication signal is transmitted with the predetermined threshold, the signal will be switched to a channel with a smaller noise when the signal noise of the first channel is larger, thereby ensuring communication, improving reliability of signal, and solving the technical problem in the power line carrier communication technology in the prior art that communication signals transmitted on the channel are interfered, resulting in abnormal communication.

In some embodiments, the switching module 46 is further configured to switch the communication signal from the first channel to the second channel when the comparison result indicates that the signal noise is greater than the predetermined threshold, wherein the second channel is a channel with minimum signal noise among a plurality of channels which correspond to the multiphase power lines respectively.

In some embodiments, the acquisition module 42 is further configured to acquire a noise amplitude on the first channel in real time; selecting a noise amplitude in a predetermined time period from the acquired noise amplitude; and calculating a root mean square value of the noise amplitude in the predetermined time period, and taking the root mean square value as the signal noise of the first channel.

In some embodiments of the present disclosure, the channel switching processing device further comprises: a stopping module, connected to the switching module 46, and configured to stop coupling the communication signal to other power lines in the predetermined time period, wherein the other power lines are power lines other than the first power line among the multiphase power lines.

In some embodiments, the device further comprises: a storage module, configured to store data information of the communication signal within the predetermined time period; and a transmission module connected to the storage module, and configured to transmit the data information to a designated unit, wherein the designated unit is a unit of one or more units connected to other power lines than the first power line among the multiphase power lines.

In some embodiments, the storage module is further configured to store identifiers of one or more inner units connected to the multiphase power lines.

The embodiments of the present disclosure further provide a storage medium having a computer program stored thereon, wherein the computer program when executed is configured to perform the steps in any of the method embodiments above.

In some embodiments, the storage medium include, but is not limited to: various media capable of storing computer programs, such as a U-disk, a Read-Only Memory (ROM), a Random Access Memory (RAM), a removable hard disk, a magnetic disk, or an optical disk.

Figure 6:
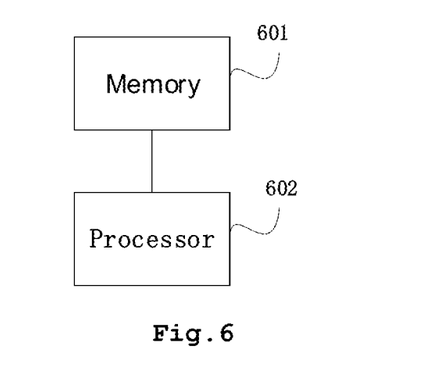
FIG. 6 is a schematic diagram of some embodiments of an electronic device of the present disclosure.

The embodiments of the present disclosure further provide an electronic device, as shown in FIG. 6, comprising a memory 601 and a processor 602, wherein the memory stores a computer program, and the processor is configured to execute the computer program to perform the steps in any of the method embodiments above.

In some embodiments, the electronic device further include a transmission means and an input/output means, wherein the transmission means is connected to the processor, and the input/output means is connected to the processor.

In some embodiments, specific examples in these embodiments refer to the examples described in the above embodiments and optional implementations, and these embodiments are not described herein again.

The above-mentioned serial numbers of the embodiments of the present disclosure are merely for description, and do not represent advantages or disadvantages of the embodiments.

In the above embodiments of the present disclosure, the description of each embodiment has its own emphasis, and reference is made to a related description of other embodiments for parts that are not described in detail in certain embodiments.

In the several embodiments provided in the present disclosure, it should be understood that the revealed technical content can be implemented in other ways. The above-described embodiments of the device are merely illustrative, and for example, the division of the units is a logical division, and in an actual implementation, there is another division, for example, multiple units or components are combined or are integrated into another system, or some features is omitted, or not executed. In addition, the shown or discussed coupling or direct coupling or communication connection between each other is an indirect coupling or communication connection through some interfaces, units or modules, and is in electrical or other forms.

The units described as separate parts are or are not physically separate, and parts displayed as units are or are not physical units, are located in one position, or are distributed on a plurality of units. Some or all of the units are selected according to actual needs to achieve the purpose of the solution of the embodiments.

In addition, functional units in the embodiments of the present disclosure are integrated into one processing unit, or each unit exists alone physically, or two or more units are integrated into one unit. The integrated units are implemented in the form of hardware, or also implemented in the form of a software functional unit.

The integrated units, if implemented in the form of a software functional unit and sold or used as a separate product, are stored in a computer readable storage medium. Based on such understanding, the technical solutions of the present disclosure in essence, or parts thereof that make a contribution to the prior art, or all or part of the technical solutions, are embodied in the form of a software product, and the computer software product is stored in a storage medium and includes several instructions for causing a computer device (which is a personal computer, a server, or a network device) to execute all or part of the steps of the methods according to the embodiments of the present disclosure. The aforementioned storage medium includes various media capable of storing program codes such as a U-disk, a Read-Only Memory (ROM), a Random Access Memory (RAM), a removable hard disk, a magnetic disk, or an optical disk.

Only the embodiments of the present disclosure are illustrated above, and it will be appreciated by those skilled in the art that various modifications and adaptations are made without departing from the principles of the present disclosure, and such modifications and adaptations are intended to be within the scope of protection of the present disclosure.

INDUSTRIAL APPLICABILITY

With the aid of the technical solutions of the embodiments of the present disclosure, by acquiring the signal noise of the first channel on which the communication signal is transmitted and determining whether or not to switch the communication signal from the first channel to the second channel with a smaller signal noise according to the comparison result of comparing the acquired signal noise of the first channel with the predetermined threshold, e.g., by determining whether or not to perform channel switching by comparing the signal noise of the first channel on which the communication signal is transmitted with the predetermined threshold, the signal will be switched to a channel with a smaller noise when the signal noise of the first channel is larger, thereby ensuring successful communication, improving reliability of signal, and solving the technical problem in the power line carrier communication technology that communication signals transmitted on the channel are interfered, resulting in abnormal communication.

The invention claimed is:

1. A channel switching processing method, comprising:
    acquiring a signal noise of a first channel which corresponds to a first power line, wherein a communication signal is transmitted on the first channel, comprising:
    acquiring noise amplitudes on the first channel in real time;
    selecting a noise amplitude in a predetermined time period from the acquired noise amplitudes; and
    calculating a root mean square value of the noise amplitude in the predetermined time period, as the signal noise of the first channel;
    comparing a magnitude of the signal noise of the first channel to a predetermined threshold; and
    switching the communication signal from the first channel to a second channel which corresponds to a second power line according to a comparison result, the signal noise of the first channel is greater than a signal noise of the second channel.

2. The channel switching processing method according to claim 1, wherein the switching the communication signal from the first channel to the second channel according to the comparison result comprises:
    in a condition that the comparison result indicates that the signal noise of the first channel is greater than the predetermined threshold value, switching the communication signal from the first channel to the second channel, wherein the second channel is a channel with minimum signal noise among a plurality of channels which correspond to multiphase power lines respectively.

3. The channel switching processing method according to claim 2, further comprising:
    stopping coupling the communication signal to other power lines in a predetermined time period after switching the communication signal from the first channel to the second channel, wherein the other power lines are one or more power lines other than the first power line among the multiphase power lines.

4. The channel switching processing method according to claim 2, further comprising:
    acquiring and storing data information of the communication signal within a predetermined time period after switching the communication signal from the first channel to the second channel; and
    transmitting the data information to a designated unit, wherein the designated unit is one of one or more units connected to other power lines than the first power line among the multiphase power lines.

5. The channel switching processing method according to claim 2, further comprising:
    acquiring and storing an identifier of an inner unit connected to the multiphase power line before acquiring the signal noise of the first channel.

6. A non-transitory computer storage medium having stored thereon computer program instructions which, when executed by a processor, implement steps of the method according to claim 1.

7. The non-transitory computer storage medium according to claim 6, wherein the method further comprising:
    stopping coupling the communication signal to other power lines in a predetermined time period after switching the communication signal from the first channel to the second channel, wherein the other power lines are one or more power lines other than the first power line among the multiphase power lines.

8. The non-transitory computer storage medium according to claim 6, wherein the method further comprising:
    acquiring and storing data information of the communication signal within a predetermined time period after switching the communication signal from the first channel to the second channel; and
    transmitting the data information to a designated unit, wherein the designated unit is one of one or more units connected to other power lines than the first power line among the multiphase power lines.

9. An electronic device comprising a memory having a computer program stored thereon, and a processor configured to execute the computer program to perform the method according to claim 1.

10. The electronic device according to claim 9, wherein the method further comprising:
stopping coupling the communication signal to other power lines in a predetermined time period after switching the communication signal from the first channel to the second channel, wherein the other power lines are one or more power lines other than the first power line among the multiphase power lines.

11. The electronic device according to claim 9, wherein the method further comprising:
acquiring and storing data information of the communication signal within a predetermined time period after switching the communication signal from the first channel to the second channel; and
transmitting the data information to a designated unit, wherein the designated unit is one of one or more units connected to other power lines than the first power line among the multiphase power lines.

12. The electronic device according to claim 9, wherein the method further comprising:
acquiring and storing an identifier of an inner unit connected to the multiphase power line before acquiring the signal noise of the first channel which corresponds to the first power line.

13. A channel switching processing system, comprising:
air conditioning units, each unit of the air conditioning units is connected with at least two power lines of multiphase power lines;
a noise detection module configured to detect signal noises of channels which correspond to all the power lines respectively; and
a channel switching module connected with all power lines of the multiphase power lines, configured to determine whether to perform channel switching according to a detection result of the noise detection module.

14. The channel switching processing system according to claim 13, wherein
the noise detection module is configured to detect a signal noise of a first channel which corresponds to a first power line among all the power lines, and further configured to compare a magnitude of the signal noise of the first channel to a predetermined threshold, wherein a communication signal is transmitted on the first channel;
the channel switching module is configured to switch the communication signal from the first channel to a second channel which corresponds to a second power line according to a comparison result, wherein the signal noise of the first channel and a signal noise of the second channel are different in magnitude.

15. The channel switching processing system according to claim 14, wherein the channel switching module is configured to switch the communication signal from the first channel to the second channel in a situation that the comparison result indicates that the signal noise of the first channel is greater than the predetermined threshold, wherein the second channel is a channel with a minimum signal noise among a plurality of channels which correspond to the multiphase power lines respectively.

16. The channel switching processing system according to claim 14, further comprising: a processor connected to the noise detection module, and configured to stop coupling the communication signal to other power lines within a predetermined time period corresponding to the signal noise on the first channel, wherein the other power lines are one or more power lines other than the first power line among the multiphase power lines.

17. The channel switching processing system according to claim 14, wherein the channel switching module is further configured to:
acquire and store data information of the communication signal within a predetermined time period corresponding to the signal noise of the first channel; and
transmit the data information to a designated unit;
wherein the designated unit is a unit of one or more units connected to other power lines in the air conditioning units, and the other power lines are power lines other than the first power line among the multiphase power lines.

18. A channel switching processing device, comprising:
an acquisition module configured to acquire a signal noise of a first channel which corresponds to a first power line, wherein a communication signal is transmitted on the first channel, comprising:
acquiring noise amplitudes on the first channel in real time;
selecting a noise amplitude in a predetermined time period from the acquired noise amplitudes; and
calculating a root mean square value of the noise amplitude in the predetermined time period, as the signal noise of the first channel;
a comparison module configured to compare a magnitude of the signal noise of the first channel to a predetermined threshold; and
a switching module configured to switch the communication signal from the first channel to a second channel which corresponds to a second power line according to a comparison result, wherein the signal noise of the first channel and the signal noise of the second channel are different in magnitude.

19. The device according to claim 18, wherein the switching module is further configured to switch the communication signal from the first channel to the second channel when the comparison result indicates that the signal noise of the first channel is greater than the predetermined threshold, wherein the second channel is a channel with a minimum signal noise among a plurality of channels which correspond to multiphase power lines respectively.

* * * * *